United States Patent

[11] 3,546,390

[72] Inventors Walter Hackenberg
Hirschlanden;
Heinz Schluter, Kornwestheim; Hilmar
Schonemeyer, Ditzingen, Germany

[21] Appl. No. 571,833
[22] Filed Aug. 11, 1966
[45] Patented Dec. 8, 1970
[73] Assignee International Standard Electric Corporation
New York, New York
a corporation of Delaware
[32] Priority Aug. 14, 1965
[33] Germany
[31] No. ST24270

[54] CONTROL EQUIPMENT FOR MULTI-STAGE CROSSPOINT ARRANGEMENTS
6 Claims, 3 Drawing Figs.

[52] U.S. Cl. .......... 179/18
[51] Int. Cl. .......... H04q 3/42
[50] Field of Search .......... 179/18.7(A), 18.7, 18.211

[56] References Cited

UNITED STATES PATENTS

| | | | |
|---|---|---|---|
| 3,423,539 | 1/1969 | Page et al. .... .......... | 179/18(.211) |
| 3,310,633 | 3/1967 | Schonemeyer .......... | 179/18(.7A) |
| 3,311,708 | 3/1967 | De Kroes .......... | 179/18(BT) |
| 3,349,189 | 10/1967 | van Bosse .......... | 179/18(.7A) |
| 3,400,220 | 9/1968 | Bowers .......... | 179/18(.7) |

*Primary Examiner*—Kathleen H. Claffy
*Assistant Examiner*—William A. Helvestine
*Attorneys*—C. Cornell Remsen, Jr., Rayson P. Morris, Percy P. Lantzy, J. Warren Whitesel, Phillip A. Weiss and Delbert P. Warner

ABSTRACT: Equipment for controlling multistage crosspoint arrangement wherein the crosspoint switching multiples are arranged in switching stages, and pairs of switching stages are grouped in vertical sections or frames. In addition, the switching multiples are arranged in horizontal groups of highways or pathways through the switching arrangement. A central marker controls the plurality of control circuits with there being a control circuit unique at least to each highway per frame. This arrangement minimizes the wiring and maximizes the efficiency and reliability of the control arrangement.

CONTROL EQUIPMENT FOR MULTI-STAGE CROSSPOINT ARRANGEMENTS

The present invention relates to equipment for controlling multistage crosspoint arrangements in switching systems, and more particularly in telephone switching systems.

In switching systems there often arises the question as to how the effective depth and the effective width of a fault caused by the failure of a more or less centralized control equipment, can be kept as small as possible, and of how to utilize the control equipments in the best way.

The expenditure for control equipment is not only dependent upon the size of the crosspoint arrangement served thereby, but is also dependent upon the logical functions which have to be performed independently of the size of the crosspoint arrangement to be controlled. From this it follows that the total expenditure on control means will become the smaller the more the control is being centralized, because then the basic portion is best utilized.

On the other hand, the failure of the control equipment affects the crosspoint arrangement all the more the greater the part of the crosspoint arrangement is, which is to be served thereby. From this it follows that the effective width of a fault becomes the smaller the more the control is decentralized.

Accordingly, there result two opposite requirements with respect to the degree of centralization of the control equipments.

In order to satisfy these requirements it is known to employ control equipments having a high degree of centralization, but to duplicate these equipments, i.e. in such a way that in the event of a failure of one equipment, the duplicate of this equipment automatically takes over and performs the functions thereof. The number of points in an existing crosspoint arrangement, which must be engaged by a control equipment, is larger the greater the degree of centralization is. This requires a very extensive and difficult-to-survey wiring between the control equipment and the crosspoint arrangement. In duplicating control equipment, all lines and cables extending to the crosspoint arrangement must also be duplicated.

It is an object of the present invention to provide equipment for controlling multistage crosspoint arrangements avoiding the aforementioned disadvantage.

The invention is concerned with control equipment for servicing crosspoint arrangements that are subdivided into several sections including one or more switching stages. The divisions into sections are made by dividing the vertical and horizontal multiples. Each section is thus subdivided into crosspoint completed partial paths. A partial path control circuit is assigned to a each crosspoint completed partial path of a section for the establishment of the connection through that partial path under the control of a central marker provided in duplicate. One control circuit for each section is used to establish a complete path through crosspoint arrangement.

By providing the subdivision into crosspoint control partial paths, it is possible, with respect to the partial path controls, to achieve a degree of centralization which, on one hand, is so small that the equipments need not be doubled (small effective width of a fault) and, on the other hand, is so large that its efficiency is utilized. The basic portion of the expenditure necessary for the logical functions, however, is completely concentrated on the central marker. This central marker, therefore, must be duplicated, but because only a relatively small number of lines exist between the partial path controls and the marker, the above mentioned disadvantage will hardly be noticed. Accordingly, the advantage of the invention resides in the combined use of centralization and decentralization by utilizing the advantages of both principles.

Moreover, it is desirable in switching systems to distribute the traffic in such a way via a crosspoint arrangement that, in the course of time, all path elements are utilized equally. In order to meet this wish it is proposed, in accordance with a further feature of the inventive equipment, that the partial path or path element selecting circuits which, in the central marker, are assigned to the individual sections of the crosspoint arrangement, are operated completely independently of one another.

In this way provision can be made for the selection of the individual path elements in accordance with statistical laws.

A good possibility of practical application of the inventive equipment is in the case of a multistage crosspoint arrangements, in which a connecting path is determined with the aid of a route search network composed of the guide wires assigned to the intermediate lines, and of the marker junctions assigned to the crosspoint multiples. In each switching stage there is performed a selection among the crosspoint multiples which, with the aid of a starting signal transmitted by their marking junctions, are characterized as coming in question for the respective connection.

In a further embodiment of the invention, a circuit arrangement for carrying out the invention is characterized in that in each stage all marking junctions used in forming part of one of the crosspoint partial paths are connected through a common starting line to a route selecting circuit associated with the central marker controlling the respective stage. This connection aids in selecting one of the starting crosspoint partial paths of the respective stage and also acts to actuate the partial path control circuit into operation. The marking junction selection circuit of the partial path control circuit selects one of the starting marking junctions of the selected crosspoint partial path.

The invention will now be explained in detail with reference to FIGS. 1 to 3 of the accompanying drawings, in which.

Figure 1:
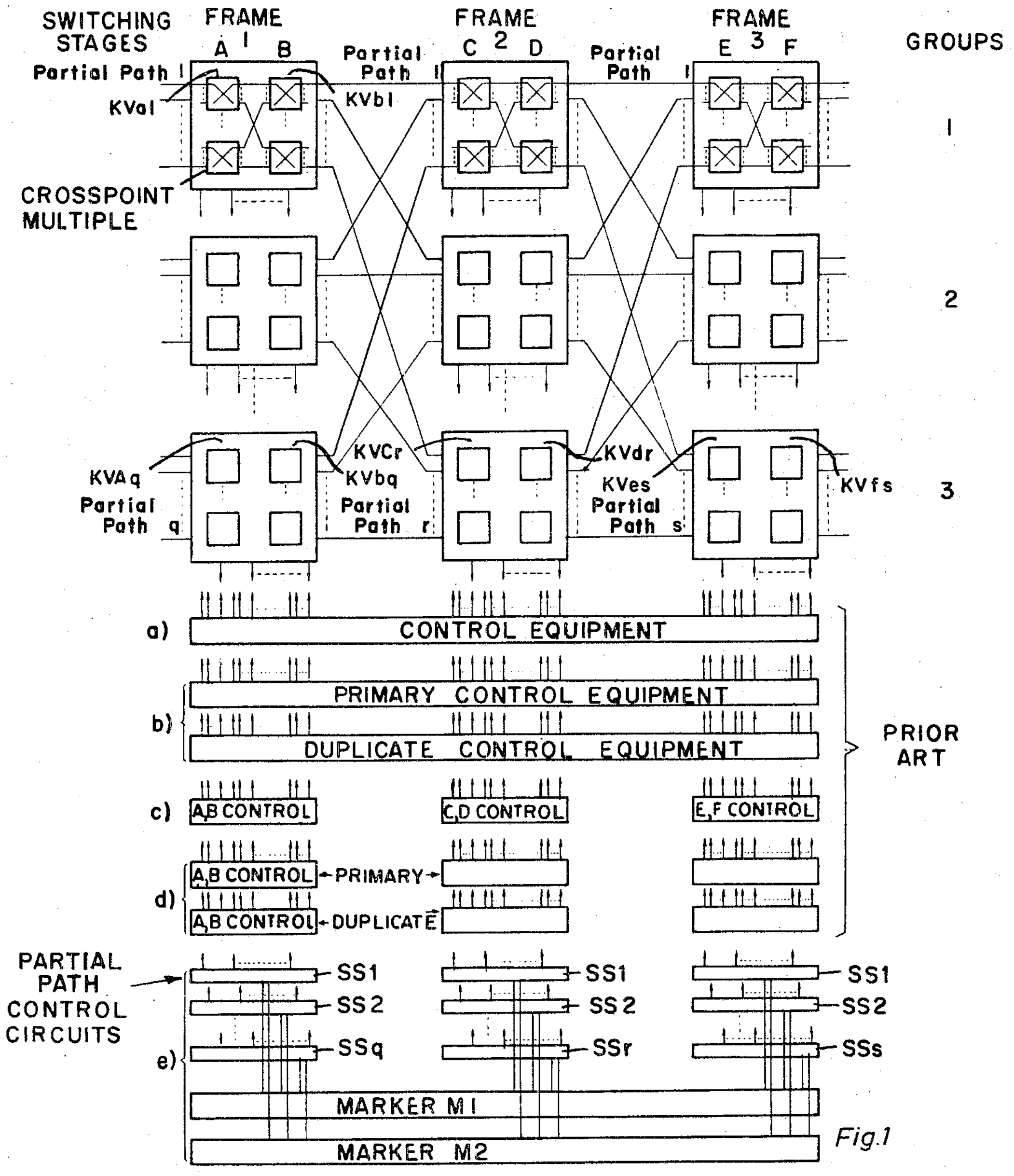
FIG. 1 shows various possibilities for controlling a crosspoint arrangement

Referring now to FIG. 1, there is shown in the upper portion thereof a crosspoint arrangement including six switching stages A—F. Each two successively following switching stages (A and B, C and D, E and F) are assembled to form a two-stage intermediate line arrangement or frame; thus, frames 1, 2 and 3 are shown.

In the lower portion of FIG. 1 and in lines *a* to *e* there are shown various possibilities for controlling this crosspoint arrangement.

According to line *a* of FIG. 1, the control of the entire crosspoint arrangement is shown as being assembled in one central control equipment. In the event of a failure of this equipment, the entire system would become unserviceable; therefore, such an arrangement of control equipment is unsuitable With one central control equipment the effective widths and the effective depths are maximum; i.e., the system can be put completely out of service when the central control equipment malfunctions.

As shown in line *b*, the central control equipment is duplicated since there is provided a primary control equipment and a duplicate control equipment. A fault in the primary control equipment still effects the complete system, but in the event of failure of one of the equipments, the work will be taken over by the duplicate control equipment. The efficiency of the equipment is subjected to an optimum utilization but, as already mentioned hereinbefore, the great disadvantage of this arrangement resides in the difficult-to-survey wiring. Moreover, the necessary decoupling of the duplicated lines represents a particular problem.

The susceptibility to interference of such a complicated wiring is considerable, and the same can be said with respect to the expenditure on supervisory switching means.

According to line *c* the control is subdivided into sections corresponding to the frames. Upon failure of one equipment, one section becomes unserviceable. With respect to effect of a control section malfunction, however, this corresponds to the failure of the entire crosspoint arrangement, because in the event of a failure of one section no connection can be established via the crosspoint arrangement.

According to line *d* each of the equipments in line *c* is duplicated. Relative thereto, two kinds of assignment of the control equipments to the crosspoint arrangement are possible: (*d*1) (not shown) Half of one each of the respective frames are fixedly assigned to each control primary and duplicate. Upon failure of one equipment, half of one section of the crosspoint arrangement will fail to operate. The adverse effects of a fault are thus rather large. The equipment is not utilized to the optimum, because each equipment must contain the basic expenditure for the logical functions. The only advantage is in the wiring which does not need to be duplicated. (*d*2) Both of the control equipments are associated with one section, or frame alternately relieving one another. Upon failure of one equipment the other one will take over the functions thereof. The system has a high degree of reliability, but the wiring is extensive and difficult to survey as in the case according to line *b*. In addition thereto, the utilization of equipment is as minimal as in the case according to *d*1.

Line *e* shows the inventive method, with the advantages of centralization and decentralization being fully utilized. The crosspoint arrangement, shown in the upper part of FIG. 1, is subdivided by horizontal divisions in each section, into several crosspoint highways. As is shown in FIG. 1, the section including the two-stage intermediate line arrangement composed of the stages A and B, is subdivided e.g. into the crosspoint highways 1—*q*.

In the same way the sections including the switching stages C and D or E and F, are subdivided into the crosspoint partial paths 1—*r* or 1—*s* respectively. As is shown in line *e*, one partial path control SS is assigned to each section of each crosspoint partial path. This partial path control functions to control the s establishment of connections within the respective partial path.

The entire number of partial path controls SS1—SS*q*, SS1-—SS*r* and SS1—SS*s* is preassigned by a central duplicated marker (M1 and M2) which, by certain selecting processes, determines one partial path in each section and serves to put its partial path control into operation. The partial paths controls, which have thus been put into operation, then serve to control the partial path internal processes governing the establishment of connections in the partial paths associated therewith.

Accordingly, those parts of the control, which are designed to set up the instructions for the crosspoint multiples and crosspoint elements, are decentralized in the partial path controls. The forming of partial paths is carried out so that the effects of a fault appearing in a highway control will remain small. Thus, the partial path controls do not need to be duplicated.

Since by far the greatest number of control leads is required for the establishment of connections within the crosspoint partial paths, and thus extend from the crosspoint partial paths to the partial path controls, the greatest part of the wiring does not need to be duplicated. Merely the relatively small number of lines extending between the partial path controls and the central marker must be doubled. Accordingly, the expenditure on lines and decoupling means is small, and the wiring is easy to survey especially since it, in accordance with the subdivision into partial paths, is separated into several parts.

The basic portion of the expenditure, which is required for the logical control functions, is completely concentrated on the central marker which gives the instructions for the establishment of the connections to the partial path controls. By centralizing the basic portion of the expenditure in a central marker, and by providing a simple structure or design of the decentralized highway controls, there will result a good utilization of the expenditure on all existing control equipments.

Figure 2:
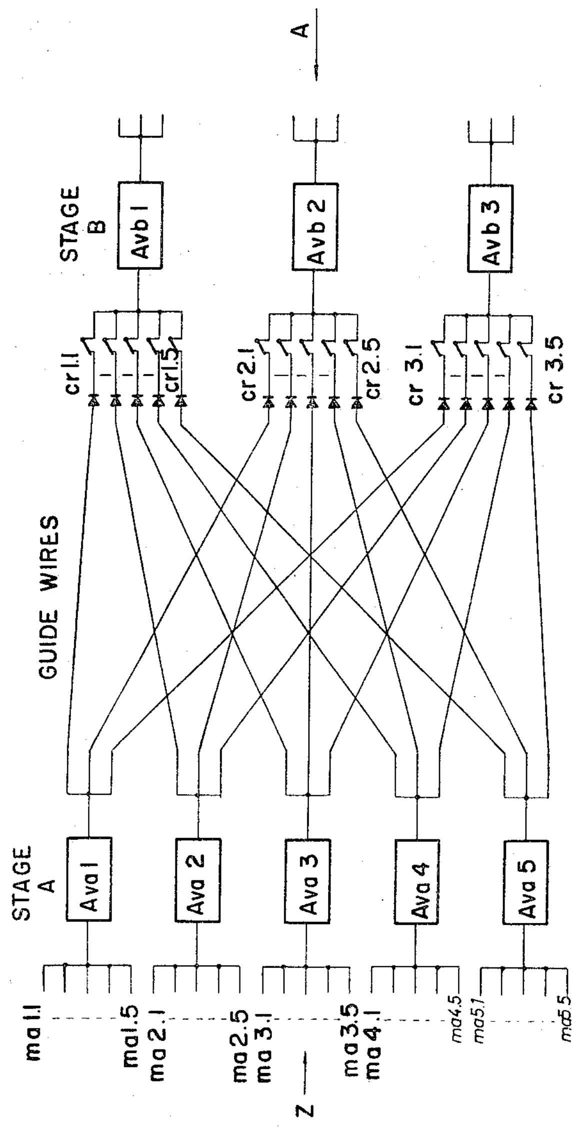
FIG. 2 shows in a schematical representation a route search network for a crosspoint arrangement.

With reference to FIG. 2 there will now be explained path selection equipment suitable for the use in a multistage crosspoint arrangement. FIG. 2 refers to the first two stages A and B of a crosspoint arrangement in which each time two crosspoint multiples of neighbouring switching stages are connected via only one intermediate line. The switching stage A includes five crosspoint multiples in each group with five inputs and three outputs each. The switching stage B includes three crosspoint multiples in each group with five inputs and three outputs. The guide wire path selecting network, as schematically shown in FIG. 2, is superimposed upon this crosspoint arrangement. This guide wire path selection network comprises the (starting or) offering amplifiers AV*a*1—AV*a*5 of the five crosspoint group 1 of stage A, forming the marking junctions, of the (starting or) offering amplifiers AV*b*1—AV*b*3 of the three crosspoint multiples of group 1 of stage B likewise forming marking junctions, and of guide wires which are guided in accordance with the intermediate lines extending between the crosspoint multiples.

One guide wire likewise corresponds to each input of the switching stage A. If an intermediate line is found busy, the break contact *cr* is opened in the guide wire associated therewith.

From the destination of a connection to be established—e.g. from all idle registers—an offering signal is fanned out in the direction indicated by A, in a not shown manner, via the guide wires to the stage B. It will be assumed that this signal there is applied to the (starting or) offering amplifiers AV*b*2 and AV*b*3. These amplifiers serve to amplify the offering signal and apply it to all guide wires extending therefrom in the direction towards stage A. Since in all of these the contact *cr* is closed, the offering signal reaches all five starting or offering amplifiers of the stage A and, via them, all of the 25 inputs of this stage. Now, via one of these inputs, e.g. *ma*2.5, there is applied an access signal. The directly applied potential acting as the access signal, of the one polarity thereby blocks the potential of the other polarity as applied via a resistor and acting as an offering signal, on this wire. Accordingly, the (starting or) offering amplifier AV*a*2 receives the offering signal (from the right) as well as the access signal (from the left). This is reported by the amplifier in the not shown manner by giving a starting signal to a selecting circuit in the marker, which adjusts itself to this marking junction and, consequently, selects the associated crosspoint multiple for the connection. Thereupon the offering amplifier AV*a*2 is caused to apply an access signal to all guide wires extending from it to the stage B. This access signal reaches all three offering amplifiers of stage B, but only in the marking junctions AV*b*2 and AV*b*3 there appears a coincidence between the offering signal and the access signal. These offering amplifiers now provide a starting signal to the marker whose selecting circuit now adjusts itself to one of the two starting offering amplifiers, thus selecting the associated crosspoint multiple for the connection. From the selected marking junction (offering amplifier) the access signal is again applied to all guide wires extending therefrom towards the right, and in this way, in cooperation with the marker, there is selected a marking junction in the next stage. The same process is repeated in all switching stages. Thereupon the connecting path is connected through via the selected crosspoint multiples.

Figure 3:
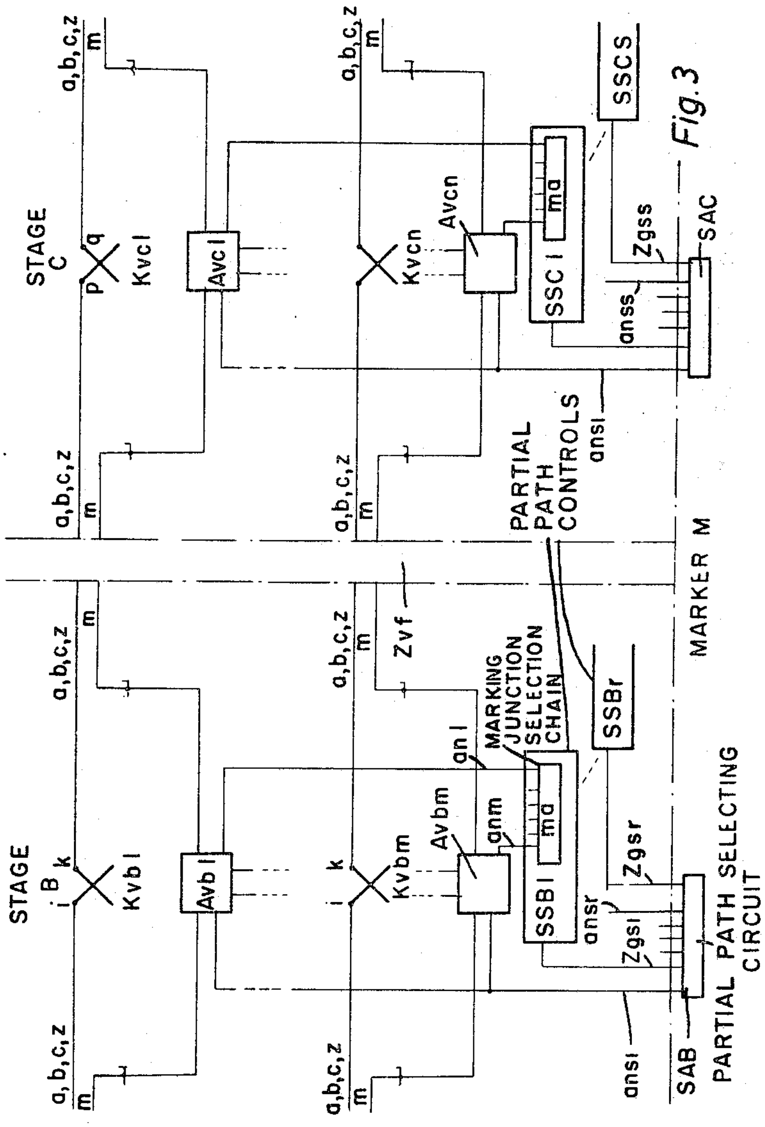
FIG. 3 shows a circuit arrangement for carrying out the inventive method in a crosspoint arrangement employing a route search network according to FIG. 2.

The inventive method may now be applied to this crosspoint arrangement in the manner as shown in FIG. 3.

In this FIG. 3 there is shown the first crosspoint multiple KV*b*1 of the switching stage B of a multistage crosspoint arrangement, and the last crosspoint multiple KV*bm* of the plurality of crosspoint completed partial paths. The stage B is divided into *r* crosspoint completed partial paths. In the same way, and of the switching stage C, there is only shown the first crosspoint multiple KV*c*1 and the last crosspoint multiple KV*cn* of the first of the *s* crosspoint completed partial paths into which this stage is subdivided.

Of each intermediate line, and by the references *a*, *b*, *c*, *z*, there are designated the wires to be connected through by a crosspoint multiple, and by the reference *m* there is designated the guide wire connected to the respective offering amplifiers AV*b*1—AV*bm*, AV*c*1—AV*cn*.

The starting wires of all offering amplifiers AV*b*1—AV*bm* of the first crosspoint completed partial path of the switching stage B are assembled to form one common starting wire *ans*1 of the first crosspoint completed partial path, and are led to a corresponding input of the partial path selecting circuit SAB serving the switching stage B in the central marker M. In a similar way the not shown common starting lines or wires *ans*2—*ansr* of the partial paths 2—*r* of this switching stage are led to further inputs of the partial path selecting circuit SAB.

Upon appearance of the access signal at various offering amplifiers of the stage B, all those at which there appears a coincidence between the offering and the access signal, will provide a starting signal. In this way, on all starting wires of those particular crosspoint completed partial paths in which at least one offering amplifier provides a starting signal, a starting signal is given to the partial path selecting circuit SAB of the marker M. The latter then adjusts itself, for the purpose of selecting a partial path, to one of the selected inputs and, via the output *zgs* 1—*zgsr* associated therewith, transmits a signal to the partial path control of the selected partial path, e.g. to the partial path control SSB1 of the first crosspoint partial path. This highway control is thus taken into operation. A marking junction selection chain MA in this partial path control SSB1 now selects one of the starting offering amplifiers by adjusting itself to one of the wires *an* 1—*anm* conducting the starting signal. The respective offering amplifier is thus caused to transmit access signals to all of the guide wires extending from it to the stage C, and the crosspoint multiple associated with it is thus fixed or determined with respect to the connecting path in stage B.

The same processes are performed in stage C and in all other not shown stages. After the performed selection of a crosspoint multiple in each switching stage, the crosspoint elements which are to be connected through in these particular crosspoint multiples, are marked from the respective partial path controls, and are connected through as soon as the marker transmits a switching order to the partial path controls.

If possible, the traffic shall be distributed in such a way throughout the entire crosspoint arrangement that in the course of time all connecting paths and, consequently, all crosspoints are being equally operated or acted upon. If now the partial path selecting circuits in the central marker, and the marking junction selection chains in the individual highway controls operate completely independent of one another, it is safeguarded that both the selection of the marking junctions and the selection of the crosspoints is performed in accordance with statistical laws; the crosspoint of a selected crosspoint multiple to be connected through, and forming part of a highway of a certain stage, is only determined by the selection of a crosspoint multiple of a highway effected in the next stage. Accordingly, the selection of a crosspoint is dependent upon the random setting of the marking junction selection chains of both the own highway and the selected partial path of the next stage.

If a partial path extends via two successively following switching stages, e.g. the switching stages B and C in FIG. 2, no partial path selection needs to be carried out in stage C after a partial path has been selected by the highway selection circuit SAB of stage B. Upon selection of the partial path 1 e.g. in stage B, the partial path control SSB1 as well as the highway control SSC1 is taken into operation. The marking junction selection in stage C may then, of course, only take place after the marking junctions have been selected in stage B, because only then the access signal can be applied to the offering amplifiers of stage C.

Under certain circumstances, the individual partial path selecting circuits SAB, SAC, etc. of the central marker may be replaced by one single partial path selecting circuit which is successively connected to the individual switching stages for the purpose of performing a partial path selection. Since the partial path selection in the individual switching stages is performed successively, i.e. one at a time in turn, it is possible in this way to reduce the expenditure.

We claim:

1. A control arrangement for a multistage crosspoint switching network which is subdivided into a plurality of vertical sections and a plurality of horizontal sections:
   - said vertical sections each comprising at least a pair of stages;
   - said horizontal sections each comprising a plurality of crosspoint completed partial paths; and
   - said partial paths included in the switching multiples of said stages, to provide a plurality of possible paths extending between the inlets and outlets of said network, a partial path control circuit for each network section, and a duplicate common marker arrangement for selecting the one of said partial path control circuits that controls the section of the crosspoint network selected by said central marker arrangement.

2. The control arrangement of claim 1 and means for operating each partial path control circuit independently of every other partial path control circuit.

3. The control apparatus of claim 1 and a route-searching network of guide wires corresponding to interstage link and of marking junctions corresponding to crosspoint multiples:
   - means at each stage for selecting the multiples at that stage;
   - means in said marker and comprising starting circuits individually associated with each of the partial paths for selecting a partial path and starting the partial path control circuit associated therewith; and
   - means comprising said marking junctions for completing a path selection.

4. The control arrangement of claim 3 and means whereby equipment in said marker and said partial path control circuits operate independently of each other.

5. The control arrangement of claim 3 and means in said marker for assigning the first stage of a partial path, and means in each of said partial path control circuits for assigning the next succeeding partial path control circuit.

6. The control arrangement of claim 1 wherein said marker includes a partial path selection circuit, and means for individually assigning said partial path selection to individual partial paths.